J. WOOLEVER.
Grain Separator.
No. 56,316. Patented July 10, 1866.
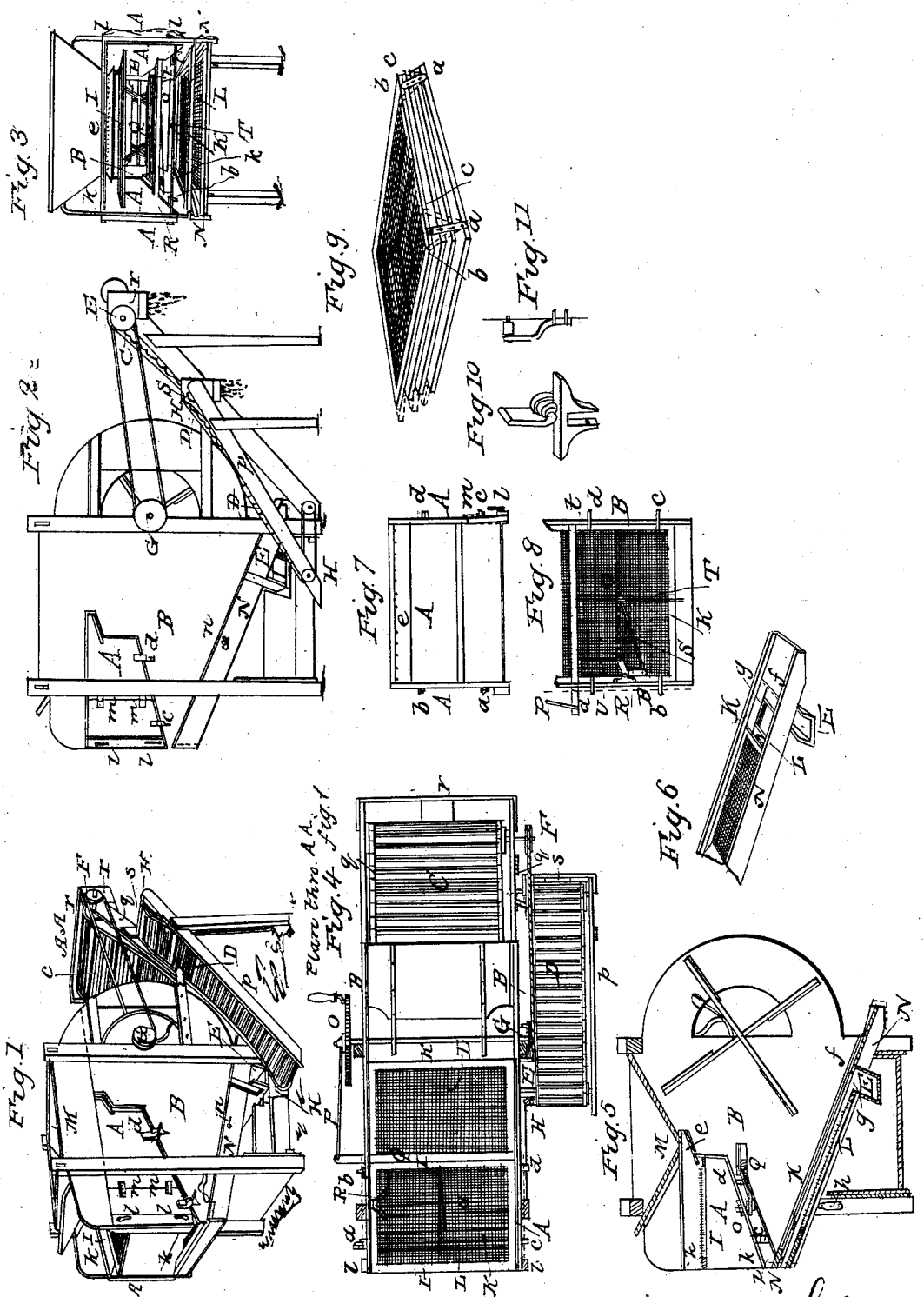

UNITED STATES PATENT OFFICE.

JAMES WOOLEVER, OF PEORIA, ILLINOIS.

IMPROVEMENT IN GRAIN-SEPARATORS.

Specification forming part of Letters Patent No. 56,316, dated July 10, 1866.

*To all whom it may concern:*

Be it known that I, JAMES WOOLEVER, of the city and county of Peoria, in the State of Illinois, have invented a new Improvement in the Machinery for a Grain-Separator; and I do hereby declare the following to be an exact description of the same, reference being had to the accompanying drawings and the letters of reference marked thereon, making a part of this specification.

In the drawings, Figure 1 is a perspective view of the grain-separator with the improvements. Fig. 2 is a longitudinal elevation of the same. Fig. 3 is a transverse section of the same. Fig. 4 is a perpendicular section of the same through the lines A A, Fig. 1. Fig. 5 is a longitudinal section of the same. Fig. 6 is a perspective view of the lower shaking-shoe, N, Fig. 1. Fig. 7 is a perpendicular section of the shaking-shoe A, Fig. 1, without the screens or the arrangement for imparting motion. Fig. 8 is the same with the screens and the arrangement for imparting motion. Fig. 9 is the perspective view of the screens and the manner of connecting them together. Fig. 10 is a perspective view of the flange-rollers supporting the shaking-shoe A, Fig. 1. Fig. 11 is a view of the roller supporting the lower shaking-shoe, N, Fig. 1.

To enable others skilled in the art to make and use my improvements, I will proceed to describe them as follows, viz: I construct the fan in any of the known forms. I construct the shaking-shoe in substantially the usual form, with this peculiar difference: I make the side of the shaking-shoe open, like a door hung on hinges, as shown at $m\ m$, Fig. 1, also shown by the dotted lines in Fig. 7. The screens, when inserted, are held in any desired position by the pressure of the sides, which are drawn and held together by means of the rods $k\ k$, Fig. 1, and the nuts $l\ l$, Fig. 1, and the same rods are shown at $k$, Fig. 7.

I join the screens (two or more) together with a metallic strip, which connects them, as shown at $a$, Fig. 9, allowing them to move as desired and change their relative position to each other, as shown by the dotted lines $a\ b$ and $a\ c$, Fig. 9, also allowing one or more of the screens to be removed by passing the screw-head through the slot in the strip shown at $a$, Fig. 9.

The shaking-shoe A, Fig. 1, is supported on four flange-rollers, (shown at $c\ d$, Fig. 1, and at $a\ b\ c\ d$, Fig. 4,) while the motion is imparted to it by means of the bell-crank and pitman P Q R, Fig. 4.

The lower shaking-shoe, N, Fig. 2, has a reciprocatory motion imparted to it by means of a pitman connecting with the rod, as shown at T and R in Fig. 8.

The position of the screens in this lower shaking-shoe I describe as follows, viz: The lower screen, L, Fig. 6, is designed to be pushed down as far as the dotted line $g$, and to deliver the inferior grain into the box E. The upper screen is designed to be pushed down as far as the dotted line $f$, and deliver its superior grain at the front of the mill. This lower shoe is supported on rollers, as shown in Fig. 11, and as shown at $h$, Fig. 5.

The elevators or carriers for elevating and sacking the grain I describe as follows, viz: They are constructed in the usual form of carriers, and of any proper material, usually of wood, on a band of heavy cloth, canvas, or leather, and are shown at C D, Fig. 1. Motion is imparted to them by means of the band from the pulley G to the pulley F, Fig. 1, the second elevator, D, being moved by the band and pulley, as shown at H, Fig. 2. These carriers elevate the grain to the boxes $r$ and $s$, whence it falls into a sack suspended to receive it.

What I claim, and desire to secure by Letters Patent, as my invention may be specified as follows:

1. The opening the side of the shaking-shoe like a door hung on hinges, and closing it and holding it firmly by means of the two rods at the top and bottom with nuts and screws, as shown at $m\ m$, Fig. 1, the rods and nuts being shown at $k\ k$ and $l\ l$, Fig. 1, the section of which is shown at $k\ l\ m$, Fig. 7, thus holding the screens, when inserted, firmly in any desired position without slides, or wedges, or grooves.

2. The metallic strip connecting the screens together, as shown at $a$, Fig. 9, allowing the screens to change their relative position, as shown by the dotted lines $a\ b$ and $a\ c$, Fig. 9, and allowing one or more of the screens to be removed by passing the head of the screw through the slot, as shown at $a$, Fig. 9.

3. The arrangement of the two elevators C and D with the shoe N and box E, as constructed, for the purpose of more effectually separating and conveying away from the machine the different grades of seed, as is herein fully set forth.

4. The use of the flange-roller shown at Fig. 10, to support and carry the shaking-shoe A, Fig. 1, as shown at c d, Fig. 1, though I do not claim the roller or its use in any other connection or for any other purpose.

5. The position of the screens in the lower shaking-shoe, N, as indicated by the dotted lines, the lower screen, L, being pushed down as far as the dotted line g, and delivering its grain into the box E, and the upper screen, K, being pushed down as far as shown by the dotted line f, and delivering the superior grade of grain at the front of the mill, the screens being held in their position by a rod and nut, as shown at n, Fig. 1.

JAMES WOOLEVER.

Witnesses:
H. W. WELLS,
WM. JACK.